(12) United States Patent
Hrabal

(10) Patent No.: US 8,248,029 B2
(45) Date of Patent: Aug. 21, 2012

(54) MULTI-FUNCTIONAL RECHARGEABLE CHARGER AND POWER SUPPLY WITH DUAL DIRECT CURRENT OUTPUTS

(76) Inventor: Frank Hrabal, Lakewood, NJ (US)

( * ) Notice: Subject to any disclaimer, the term of this patent is extended or adjusted under 35 U.S.C. 154(b) by 415 days.

(21) Appl. No.: 12/655,013

(22) Filed: Dec. 22, 2009

(65) Prior Publication Data

US 2010/0156342 A1   Jun. 24, 2010

Related U.S. Application Data

(60) Provisional application No. 61/203,621, filed on Dec. 24, 2008.

(51) Int. Cl.
*H02J 7/00*   (2006.01)
(52) U.S. Cl. ...................................... 320/110
(58) Field of Classification Search .................. 320/110; 307/43, 64–66
See application file for complete search history.

(56) References Cited

U.S. PATENT DOCUMENTS

| | | | | |
|---|---|---|---|---|
| 6,014,009 A | * | 1/2000 | Wierzbicki et al. | 320/107 |
| 7,274,168 B2 | * | 9/2007 | Tskukamoto et al. | 320/106 |
| 7,446,502 B2 | * | 11/2008 | Tong | 320/110 |
| 7,764,045 B2 | * | 7/2010 | Hoffman et al. | 320/107 |
| 7,816,886 B2 | * | 10/2010 | Brandon et al. | 320/110 |

* cited by examiner

*Primary Examiner* — Richard V Muralidar
(74) *Attorney, Agent, or Firm* — Clifford G. Frayne

(57) ABSTRACT

A hand held charger for a plurality of different manufacturers electronic hand devices capable of supplying electrical capacity in devices from the 3.6 to 4.2 volt range and capable of operating on lithium or rechargeable Li-Ion batteries, the charger having a sensing means to determine which type of batteries are presently installed in the charger, the charger having both a mini-USB and 3/32 stereo-mono input and a USB and 3/32 stereo-mono output, as well as incorporating a flashlight LED and capacity indicia indicator.

5 Claims, 2 Drawing Sheets

MULTI-FUNCTIONAL RECHARGEABLE CHARGER AND POWER SUPPLY WITH DUAL DIRECT CURRENT OUTPUTS

RELATED APPLICATIONS

Applicant claims the benefit of provisional application Ser. No. 61/203,621, filed Dec. 24, 2008.

BACKGROUND OF THE INVENTION

1. Field of the Invention

The present invention relates to a portable charger for hand-held electronic instruments such as cell phones, MP3 players, and the like, the charger adapted to receive two different types of batteries, namely lithium-ion and lithium batteries, the charger having the capability of changing out a depleted lithium-ion battery for a fully charged lithium-ion battery, or a plurality of lithium batteries as a result of the uniquely designed battery holder.

2. Description of the Prior Art

Cell phones, MP3 players, blackberries, and other hand-held communication devices or entertainment devices operate on the manufacturer's rechargeable battery. The manufacturer provides a power cord for recharging these batteries when one is in proximity to an electrical outlet. The manufacturers also manufacture and sell a portable recharger when an electrical outlet is not readily available. These portable rechargers are designed to fit the manufacturer's own products, and do not have universal fittings so that they can be used on other electrical products. There may be other batteries whose voltages and capacities are adequate to be used in the device, however, their size and connections prevent them from being used.

Prices for these batteries are often in the $30.00 to $50.00 range. Applicant's charger would be based on the 18650 lithium ion rechargeable batteries used in 95% of laptop computers. Its capacity ranges from 2,000 to 2,600 mA's which is more than twice the capacity of many cell phone equipment manufacturer's own battery designs. The battery is inexpensive and easily obtainable, and with Applicant's designs would interface it with many devices, it is a very practical product which would provide an emergency back up power source when needed. Additionally, Applicant's charger can accept two CR123A 3 volt non-rechargeable batteries for use in recharging hand held electrical instruments. Applicant's charger can automatically sense which batteries have been installed in order to prevent the two CR123A non-rechargeable lithium batteries from being recharged and yet provide a charging current to the charger.

OBJECTS OF THE INVENTION

An object of the present invention is to provide for a novel charger for hand held electrical instruments which supplies electrical capacity to devices in the 3.6 to 4.2 volt range.

A still further object of the present invention is to provide a novel charger which will provide two output voltages, 4.2V power source and 5.5V charger current, the 4.2 volt will be accessed by means of a 3/32 stereo-mono connector and serve as an I/O jack to other electrical devices. The 5.25-5.5 volt USB jack will serve only as an output charging current source.

A still further object of the present invention is to provide for a novel charger which will accept two different types and sizes of batteries and which will automatically determine which batteries have been installed and automatically make the appropriate adjustments for the delivery or supply of electrical power to the Li-Ion rechargeable batteries and not the lithium batteries.

A still further object of the present invention will be to provide for a novel charger which will also incorporate an LED lamp.

A still further object of the present invention is to provide for a novel charger, the housing of which provides a means for attaching it to other hand held electrical devices, thus insuring extra power for such hand held device.

A still further object of the present invention is to provide for a novel charger which includes a battery sensing circuit which will enable one type of battery, the 18650 lithium ion battery, to be recharged and not the lithium CR123A batteries.

A still further object of the present invention is to provide for a novel charger which is compatible with a plurality of manufacturers different electric hand held devices.

A still further object of the present invention is to provide for a novel charger which will allow other electronic hand held devices to be secured to it and to function as a primary or backup power source.

SUMMARY OF THE INVENTION

A hand held charger for a plurality of different manufacturers electronic hand devices capable of supplying electrical capacity in devices from the 3.6 to 4.2 volt range and capable of operating on lithium or rechargeable Li-Ion batteries, the charger having a sensing means to determine which type of batteries are presently installed in the charger, the charger having both a mini-USB and 3/32 stereo-mono input and a USB and 3/32 stereo-mono output, as well as incorporating a flashlight LED and capacity indicia indicator.

BRIEF DESCRIPTION OF THE DRAWINGS

These and other objects of the present invention will become apparent particularly when taken in light of the following illustrations wherein.

DETAILED DESCRIPTION OF THE INVENTION

Figure 1:
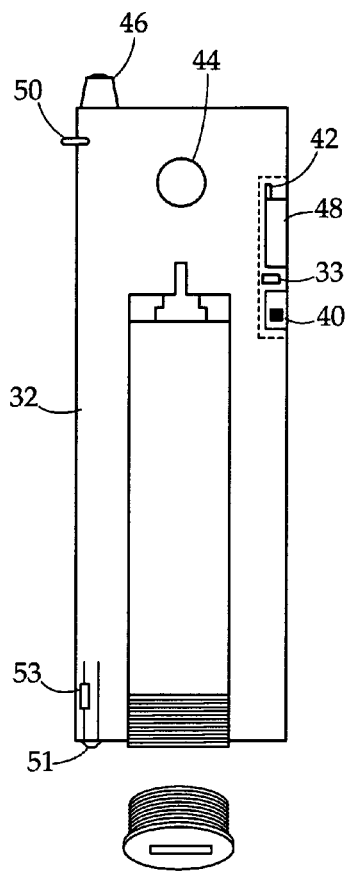
FIG. 1 is a planar view of the charger of the present invention.
Figure 2:
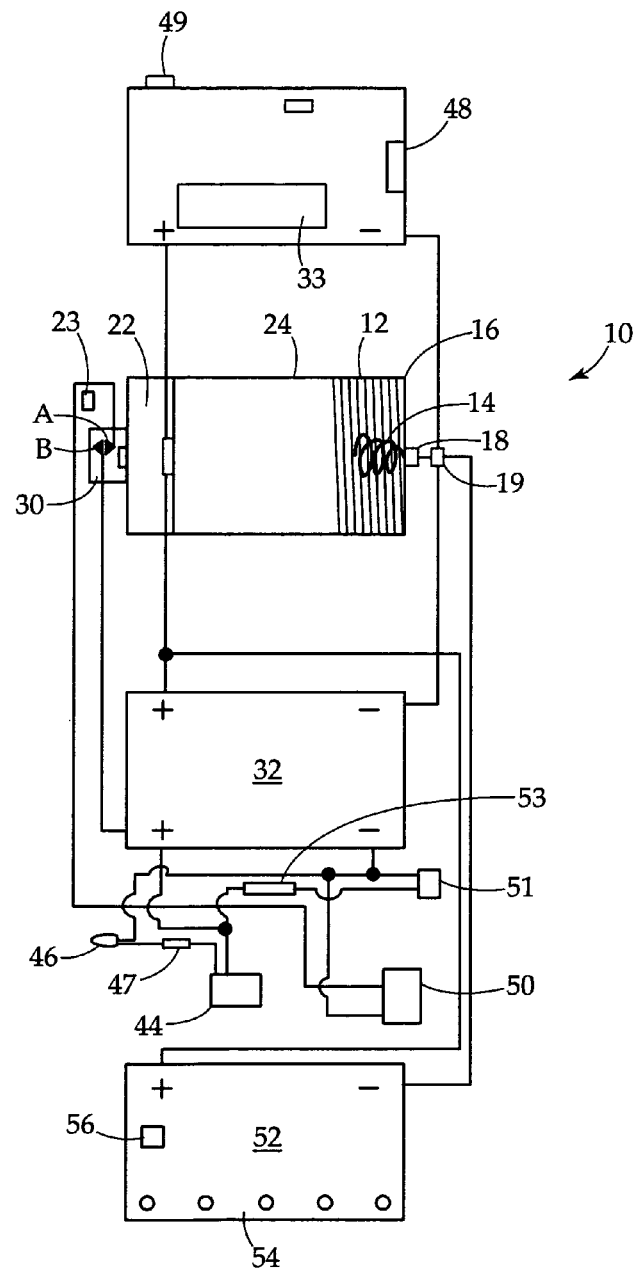
FIG. 2 is an electrical schematic of a portable charger/multi-functional power device of the present invention.
Figure 3:
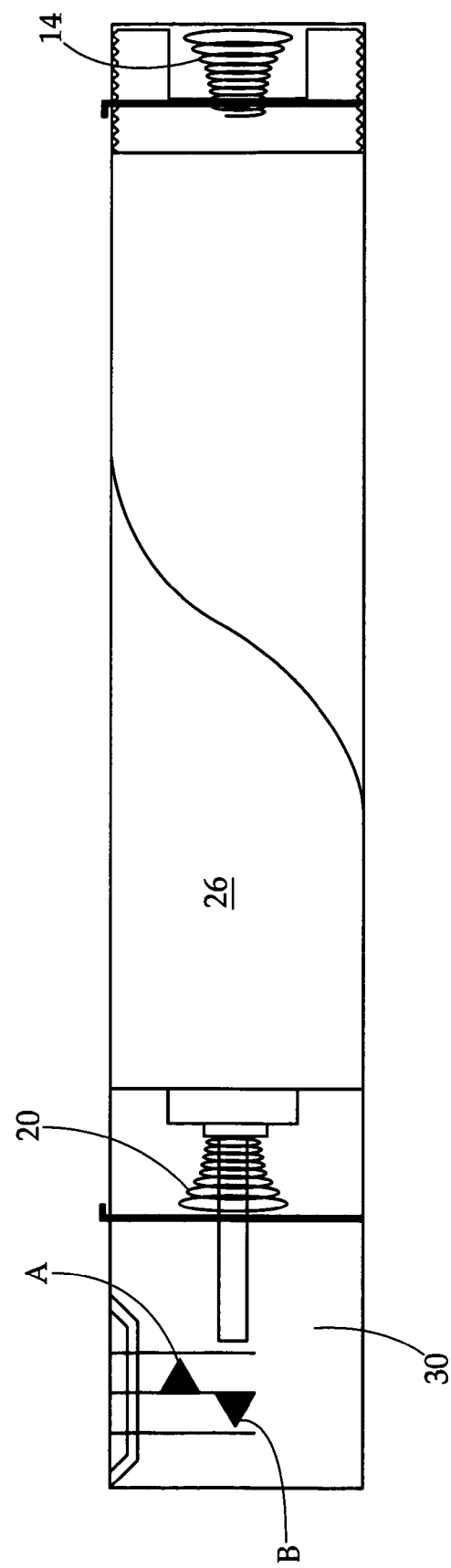
FIG. 3 is a cross-section of the battery compartment.

Applicant's charger 10 as illustrated in FIG. 1 is designed to be portable and easily transportable and approximate the size of those hand held electrical appliances for which it is intended. FIG. 2 illustrates the circuitry of charger 10 and FIG. 3 is a cross-section of the battery compartment. In the preferred design, the housing 11 would define an internal space of approximately 3 inches in length and 1 5/16ths inches in width, and depth of 7/8ths of an inch. A portion of the internal space defined by the housing would be designed as the power source receptacle or battery compartment 12 and would include a biasing means 14 at a first end 16 in communication with the contact 18, poly switch 19 and a contact end 20 at the opposing end 22 of receptacle 12. Interposed there between would be the power source 24 in the form of a battery or batteries.

In Applicant's design, the battery holder receptacle 12 will accommodate two different power sources 24. The first power source 26 being a rechargeable 3.7 volt lithium ion 18650 battery 26 having a length of 2 9/16ths inches. Alternatively two CR123A batteries 28 could be positioned in the power receptacle 12, the two CR123A batteries having a total length of 2$^{11}/_{16}$ths inches. Each of these CR123A batteries are 3 volt non-rechargeable batteries. In order that the receptacle 12 and the charger circuit can identify which batteries have been positioned in the power receptacle 12, a contact sensor 30 is installed proximate contact 20, which sensor can take many forms such as a plunger, the position and contacts of which are dependent upon the length of the batteries, the contact sensor identifying the $1/8^{th}$ inch difference in the overall length of the respective batteries. The sensor is activated into either a contact position A or contact position B depending upon the type of installed power source 24 and its length in the power receptacle 12 by means of the contact mounts identified as 1, 2, and 3. A diode 23 prevents the lithium CR123A batteries from being charged. This information is related to a protection circuit board 32 within the housing, which protects the power supply. Protection circuit board 33 protects the charging circuit.

The protection circuit boards 32 and 33 are in communication with power receptacle 12, and is also in communication with the poly switch 19, which resets after a fault is cleaned and power to the circuit is removed, the on/off power switch 40 for the device, and the USB outlet ports for the device, as well as the LED flashlight and a capacity fuel gauge.

The charger is powered by an on/off switch 40 and may function automatically when a charging current is applied to the mini-USB 51 power input, which is protected by diode 53, which also activates a power LED 42 or 52 fuel gauge to indicate the status of the charger. A second switch 44 associated with the charger activates an LED flashlight 46. When the main power switch 40 is activated, power is supplied to a USB output 48. A 3/32 stereo-mono input/output jack 50 will have an output power supply capacity of 4.2 volts max with the 18650 Li-Ion batteries, while the USB output capacity is 5.25-5.5 volts. An optional capacity gauge 52 positioned on the outer housing will provide the user with a visual indication of the electrical power capacity by means of a series of gradated lights 54 which would be switch activated by a separate switch 56 on the presence of a charging current.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

I claim:

1. A multi-functional, rechargeable charger and power supply for hand-held electronic instruments, the multi-functional rechargeable charger and power supply comprising:
   a housing;
   a battery compartment dimensioned to accommodate a single lithium-ion battery, or two lithium batteries;
   a sensor which senses the presence of a lithium-ion battery or two lithium batteries within said battery compartment;
   a recharging circuit for recharging said lithium-ion battery when present, said sensor preventing recharging when said lithium batteries are present;
   dual direct current inputs and dual direct current outputs.

2. The multi-functional rechargeable charger and power supply in accordance with claim 1 wherein said battery compartment sensor differentiating said lithium-ion battery from said two lithium batteries comprises a contact sensor which differentiates the length of said lithium-ion battery from said two lithium batteries.

3. The multi-functional rechargeable charger and power supply in accordance with claim 1 wherein said housing of said multi-functional rechargeable charger and power supply includes a multi-functional on/off switch, visual on/off LED light indicator, and visual power gauge providing indicia of the strength of the batteries.

4. The multi-functional rechargeable charger and power supply in accordance with claim 1 wherein said lithium-ion battery comprises model 18650.

5. The multi-functional rechargeable charger and power supply in accordance with claim 1 wherein said lithium batteries comprise model number CR123A.

* * * * *